June 20, 1961 V. L. HELGESON ET AL 2,988,816
ALTIMETER RANGING
Filed July 16, 1956

INVENTORS
Virgil L. Helgeson &
BY Edward J. Lopez
E. W. Christen
ATTORNEY

United States Patent Office 2,988,816
Patented June 20, 1961

---

2,988,816
ALTIMETER RANGING
Virgil L. Helgeson and Edward J. Loper, Milwaukee, Wis., assignors to General Motors Corporation, Detroit, Mich., a corporation of Delaware
Filed July 16, 1956, Ser. No. 598,032
14 Claims. (Cl. 33—46.5)

This invention relates to altimeter ranging apparatus for measuring the horizontal range or distance from an initial position of an elevated craft to a target or destination point. The invention is specially suited for use in bombing navigational computers which require a measure of the ground range distance from a target at some point in the course of a bombing run in order to initiate the solution of a bombing problem.

It has been customary to obtain such range information through the use of radar apparatus, or by flying the craft over an identification point located a known distance from the target. Both of these methods, however, have certain operating and tactical disadvantages. The radar, of course, may fail or be jammed. An identification point may not always be available, and where it is, the pilot may still have some difficulty in singling out such a point and flying the craft over it.

The present invention has for its general object to provide an apparatus for obtaining a measure of the horizontal or ground range distance of an elevated aircraft from a distant target without the use of radar information or imposing any restriction on the manner and course of flight of the craft.

Another object is to provide apparatus of the above character that may be used to obtain a measure of the ground range of an aircraft from a target in either a dive approach or a high level approach mode of the aircraft.

Another object is to provide means for facilitating tracking of the target in the course of operating apparatus of the above character in order to obtain an accurate measure of the ground range of the craft relative to the target.

The above and other objects, together with the features and advantages of the present invention, will appear more fully from the following detailed description and drawings, wherein.

Figure 1:
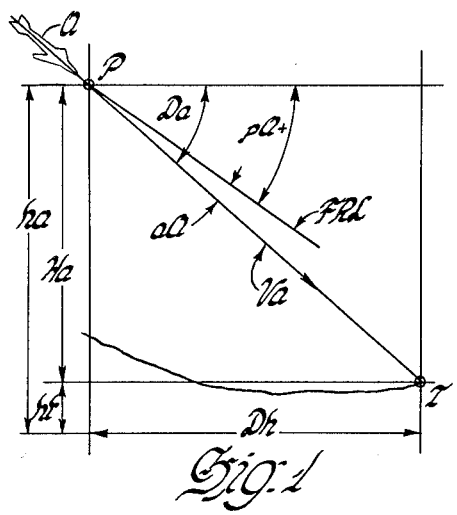
FIGURE 1 illustrates the geometry involved in the solution of a ranging problem by the apparatus of the present invention with the aircraft in a dive approach mode.

Referring to the drawings, FIGURE 1 illustrates an aircraft A diving along a dive path on a target T displaced a horizontal distance $D_h$ in a vertical plane passing through the point P along the dive path. The height of the craft from the point P above the horizontal plane containing the target is represented by the distance $H_a$, and its velocity vector $V_a$ or direction of flight is shown directed at the target, making an angle $D_a$ measured from a horizontal plane passing through the point P.

Angle $D_a$ is known as the dive angle and is shown as being composed of a pair of angular quantities that includes aircraft pitch angle $pA$, which is measured from the horizontal to the fuselage reference line or zero lift line of the craft, and attack angle $aA$, which is measured from the fuselage reference line labeled FRL to the velocity or true airspeed vector $V_a$. The altitude $H_a$, which is shown in the present case as being slightly greater than the vertical distance of the craft above the ground or terrain directly below, is equal to the difference between the absolute altitude or height of the craft above sea level, represented by the quantity $h_a$, and the fixed quantity $h_t$ representing the known distance of the target above sea level. By triangulation, it will be seen that the distance $D_h$ may be represented by the equation $$D_h = H_a \text{ cotangent } D_a \qquad (1)$$

The present invention instruments the components that make up the quantities of the above equation and converts them into electrical signals which are combined in a direct analog computer that continuously solves the equation for $D_h$.

In order to establish the dive angle $D_a$, the pilot visually tracks the target, preferably through an optical sight head having an elevation and an azimuth drive for displacing the tracking reticle display or pipper provided thereby. In accordance with one aspect of the present invention, angle of attack $aA$ information is supplied to the elevation drive of the sight head in order to depress the line of sight, which is normally directed along the fuselage reference line, so that it will coincide with the direction of the velocity vector. This causes the air speed vector and line of sight to remain parallel throughout the dive and greatly facilitates target tracking in this mode. Further improvement in target tracking and system accuracy is provided by instrumenting a drift angle compensation into the azimuth drive of the sight head in order to compensate for cross wind effects tending to displace the craft from the initial craft-to-target plane position.

Attack angle $aA$ and height of the craft above sea level $h_a$ are continuously measured by attack angle and absolute altitude sensing transducing apparatus, which may be included in an air data computer, while pitch angle $pA$ is obtained from a suitable vertical reference source such as a vertical gyro carried by the craft. Electrical quantities representative of pitch angle $pA$ and attack angle $aA$ are combined in a summing amplifier of a servo repeater, while $H_a$ is obtained by subtracting a fixed electrical quantity proportional to the known target altitude, $h_t$, from the continuously measured aircraft altitude above sea level, $h_a$, and applying the difference signal to a servo multiplying network, which in its simplest form may include a cotangent potentiometer positioned by the servo repeater, to obtain $D_h$.

Figure 2:
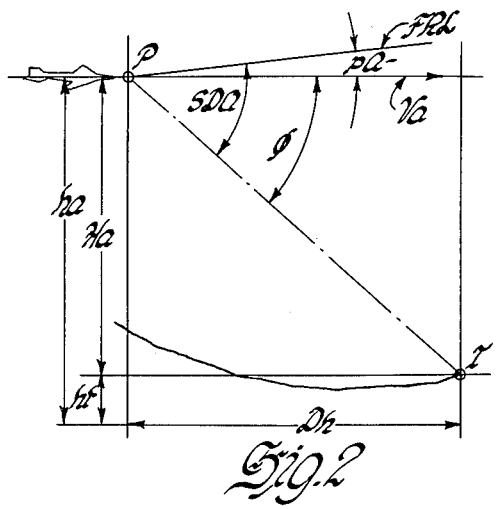
FIGURE 2 illustrates the geometry involved in the solution of a ranging problem by the apparatus of the present invention with the aircraft in a high level approach mode.

In the level approach mode illustrated in FIGURE 2, the aircraft is shown flying in a direction parallel to the horizontal plane of the target. In this case, dive angle is zero and the computation of the ground range distance $D_h$ is obtained by depressing the line of sight of the sight head by an amount termed herein as the sight depression angle, SDA, shown as the angle between the fuselage reference line and the line from the point P intersecting the target T. From FIGURE 2 it will be seen that the ground range distance $D_h$ is equal to $$D_h = H_a \text{ cotangent } \phi \qquad (2)$$

where the angle $\phi$ is the difference between the fixed sight depression angle SDA and pitch angle. Since pitch angle and attack angle are equal and opposite in the level approach mode illustrated, the angle $\phi$ may be obtained from the algebraic summation of SDA and $pA$.

In the level approach mode the pilot depresses the line of sight of the sight head represented by the dashed an dotted line until the line passes through the target, or, with a fixed sight depression angle, flies the craft until the depressed line of sight passes through the target, at which time the distance $D_h$ may be obtained from instantaneous values of the $H_a$ and $\phi$ in Equation 2. The sight line or tracking reticle of the sight is depressed by feeding an electrical quantity representative of the sight depression angle into the elevation drive of the sight head. In order to facilitate target tracking in this mode, pitch angle is also applied to the elevation drive for stabilizing the line of sight.

Figure 3:
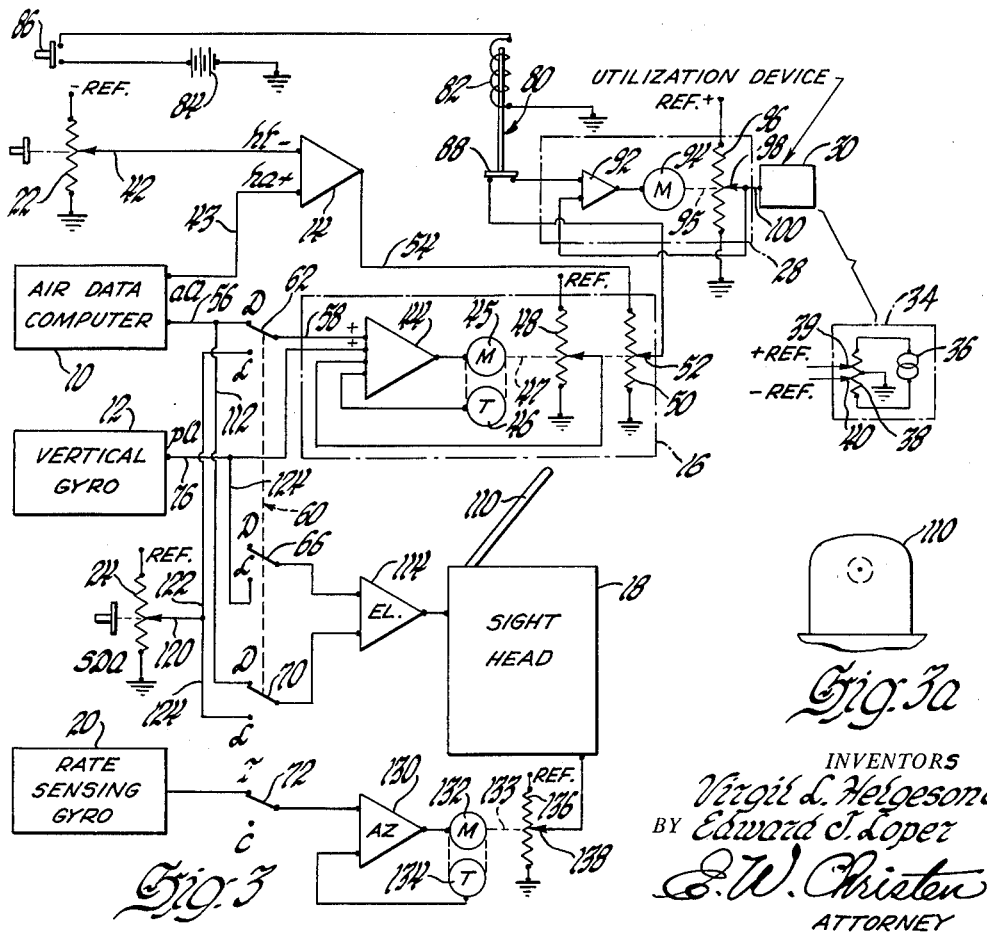
FIGURE 3 is a schematic and block diagrammatic circuit illustration of an apparatus in accordance with the present invention.
Figure 3A:
FIGURE 3a is a view of a detail of the sight head of FIGURE 3.

The mechanization of a form of apparatus utilizing the principles of the present invention for obtaining a measure of the ground range distance $D_h$ is illustrated block diagrammatically in FIGURE 3 which includes an air data computer 10, a vertical gyro 12, a summing amplifier 14, dive angle servo 16, sight head 18, rate gyro 20, a pair of hand set data sources 22 and 24 for $h_t$ and SDA, respectively, a data repeater 28 and a utilization device 30. The device 10 may be a type AXC–129 Air Data Computer available from the Westbury Division of Servomechanisms, Inc. and provides a plurality of continuous alternating current output signals including attack angle $aA$ and the quantity $h_a$ which is the absolute tape line altitude of the craft above sea level. The vertical gyro 12 may be a type JG7044A vertical gyro obtained from Minneapolis Honeywell and produces a linear alternating current output signal corresponding to the pitch angle $pA$ quantity representing the attitude of the craft in the air mass relative to a reference vertical established by the gyro. The height $h_t$ of the target above sea level is known in advance and is set into a manually adjustable linear potentiometer or like device shown at 22. The pot 22 is energized from a reference source shown at 34 which may include a 400 cycle constant voltage alternator 36 that energizes a linear potentiometer 38 having a grounded center-tap and a pair of adjustable sliders 39, 40 by means of which reference voltages of opposite phase may be provided. The quantity $h_t$ from potentiometer 22 is applied over line 42 along with $h_a$ over line 43 from the air data computer to the input of the amplifier 14.

The dive angle servo 16 includes a conventional summing amplifier 44, the output of which controls the direction and extent of rotation of a reversible servo motor 45. The motor 45 may be a two phase A.C. motor whose control winding is energized in accordance with the output of the servo amplifier and whose reference winding is energized from the reference source, in known manner. Motor 45 drives a stabilizing position feedback tachometer 46 and positions a loop-closing linear potentiometer 48, which is energized from the reference source 34, and a cotangent potentiometer 50, which is connected to line 54 for energization from the output of amplifier 14.

An alternating current quantity proportional to the attack angle is applied over line 56 from the output of the air data computer through one position of one section of a ganged mode selector switch 60 to the input of the amplifier 44 in the dive angle servo. The switch 60 is illustrated as a 3 PDT switch, the poles or switch arms 62, 66 and 70 of which are operable between a pair of switch contact positions labeled D and L associated with each switch arm. Arm 62 is connected over conductor 58 to the input of the amplifier 44. Pitch angle is supplied from the vertical gyro over conductor 76 to the input of the amplifier 42 which combines the pitch angle and attack angle quantities and produces a rotation of the shaft 47 of motor 45 corresponding to the sum of these two angles to give dive angle $D_a$. The cotangent potentiometer 50 has its positionable arm or slider 52 mechanically connected to the shaft of the motor 45 and, since the potentiometer is energized by the difference of $h_a$ and $h_t$, the potential of slider conductor 52 relative to ground will be proportional to the product of $H_a$ and cotangent $D_a$, thus yielding $D_h$.

The output of the potentiometer 50 may then be applied directly to a utilization device, or, if desired, it may be supplied to the input of a servo repeater 28 through the contacts of a relay device 80. The relay 80 includes an operating coil 82 which is adapted to be energized from, say, a battery source 84 through a spring return push button 86. The button 86 is operated by the pilot to energize the relay and cause it to pick up its normally closed back contacts 88, thus interrupting the signal input to the repeater from the potentiometer 50. The repeater 28 includes the servo amplifier 92, servo motor 94 and loop closing, linear potentiometer 96 which is energized from the reference source 34 as indicated and has its slider arm 98 mechanically positioned by the shaft 95 of the servo motor 94 and electrically connected over conductor 100 to the utilization device 30. Thus, when the button 86 is depressed, the value of $D_h$ is stored in the servo repeater and may be indicated on a meter or other display means constituting the utilization device.

Sight head 18 may be a conventional servo driven optical sight head such as the model A–4 which produces a fixed reticle display, such as a ten mil segmented circle, and a tracking index or center pip, which may be a two mil dot. Both the circle and center pip are projected and displayed in illuminated form on a transparent combining glass shown at 110 or on the windshield of the aircraft in the direct view of the pilot. The optical system producing the tracking index may be displaced in elevation and azimuth by suitable servo drive mechanisms which are associated with an elevation input channel and an azimuth input channel provided in the sight head. The pipper may represent the fuselage reference line or armament line of the craft and is normally aligned with the circle when the sight is used as a fixed sight.

It should be appreciated that the sight head is not used in the present invention in a predicting or computing capacity, but merely to provide a fixed sight line which may be displaced in elevation and azimuth to facilitate target tracking in the dive and level approach modes. In the dive mode, for example, attack angle information is fed from the air data computer over line 112 through switch 70 which is connected to the input of the amplifier 114 in the elevation channel of the sight. This enables the pilot to displace the sight line in elevation so that it will be parallel to the direction of movement of the craft, thereby enabling the pilot to keep the pipper on the target regardless of variations in dive angle or throttle setting. If the sight line were retained in its normal setting directed along the fuselage reference line, it would be necessary for the pilot to change the attitude of the craft continuously during the dive approach by nosing the plane upwardly in order to fly a path aimed at the target and to keep the pipper on the target. After the pilot has acquired the target with the fixed reticle and center pipper, he may actuate the button 86 at any time along the flight path and obtain a reading on the utilization device 30 corresponding to the horizontal range distance to the target at the time the push button was depressed.

In the level approach mode the sight line is depressed by the sight depression angle SDA shown in FIG. 2 in order to establish a sight line from the craft to target. The sight depression angle will vary somewhat with the altitude of the craft and may range from about 7 degrees to 20 degrees, for example. An electrical signal proportional to the sight depression angle is developed in the apparatus from the manually set potentiometer 24 which is energized from the reference source 34 and supplies an electrical signal to the input of the amplifier 44 and the sight head amplifier 114 over conductors 120, 122 and 124 as shown, when the ganged switches 62, 66 and 70 are in their lower or level selector position. A pitch angle signal is applied from the vertical gyro over conductor 76 to the input of the amplifier 44 and over conductors 76 and 124 to the amplifier 114 through switch 70. The output of the amplifier 44 will then be proportional to the angle $\phi$, and the signal appearing on slider arm 52 of the cotangent potentiometer 50 will be proportional to $H_a$ cotangent $\phi$, yielding $D_h$ in this mode. The pitch angle signal is also applied to the input of the elevation amplifier 114 in order to stabilize the sight line in this mode.

In order to compensate for cross-wind effects tending to displace the craft from the initial craft-to-target-plane position, a drift angle compensation may be instrumented into the azimuth channel of the sight head. In the dive approach mode, for example, the azimuth drive of the sight head is caged or fixed in a central position at the beginning of the dive. Upon acquiring the target with the pipper, the azimuth drive is uncaged by connecting the electrical output of a conventional rate gyro device indicated at 20 to a motor-tachometer integrator servo in the azimuth channel of the sight. The integrator comprises the amplifier 130, motor 132, tachometer 134 and potentiometer 136, the slider arm 138 of which is positioned by the shaft 133 of the motor 132 and is electrically connected to the sight head 18. Upon operating the track-cage selector switch 72 to the track selector position, the pilot tracks the target for a brief interval, thereby establishing a flight course having a velocity component opposite to that of the effect of the cross-wind or target motor. By introducing the drift angle in this way, it becomes unnecessary to know the magnitude of the cross-wind or to fly any particular bearing during the approach path. After the proper drift angle compensation has been established and the target has been acquired by the pipper, the pilot operates to button 86 in either of the above described modes to obtain the value of the horizontal range distance.

Although a specific embodiment of the invention has been shown and described, it will be understood that it is but illustrative and that various modifications may be made therein without departing from the scope and spirit of the invention.

What is claimed is:

1. Means for obtaining a measure of the horizontal range distance of an aircraft from a target including means establishing a sight line from the craft to the target, means measuring the vertical altitude of the craft above a horizontal target plane normal to an altitude vertical plane through the craft and producing an electrical signal proportional thereto, means measuring the angle between the said line of sight and one of said planes, an electrical multiplying network including trigonometric resolving means positionable in accordance with the magnitude of said measured angle to provide an electrical signal proportional to a tangential trigonometric function thereof and means supplying said altitude signal to said multiplying network for multiplication with said tangential trigonometric function of said angle to produce an electrical output signal proportional to the product thereof, and utilization means connected to said multiplying network to receive the said product signal.

2. Means for obtaining a measure of the horizontal range distance of an aircraft from a target including means establishing a sight line from the craft to the target; means measuring the vertical altitude of the craft above a horizontal target plane normal to an altitude vertical plane through the craft and producing an electrical signal proportional thereto; means measuring the angle between the said line of sight and one of said planes and producing an electrical signal proportional thereto, a servo multiplying network including a servo motor controlled by said last named signal and producing a shaft rotation proportional to said measured angle, trigonometric resolving means positioned by said servo motor to produce a quantity proportional to a tangential trigonometric function of said measured angle, and means supplying said altitude signal to said multiplying network for multiplication by said tangential trigonometric function of said angle to produce an electrical signal proportional to the product thereof; and utilization means connected to said multiplying network to receive the said product signal.

3. The combination in accordance with claim 2 above wherein said altitude measuring means includes absolute altitude sensing and transducing means measuring the absolute altitude of the craft above sea level and producing an electrical signal proportional thereto, manually adjustable means providing an electrical signal proportional to the known altitude of the target above sea level, and electrical combining means connected to receive said absolute altitude signal and said target altitude signal and producing a resultant signal related to the difference therebetween.

4. The combination in accordance with claim 2 above wherein said angle measuring means includes means measuring craft angle of attack and producing an electrical signal proportional thereto, a vertical reference source producing an electrical signal related to the pitch angle of the craft, and electrical combining means connected to receive the said attack angle and pitch angle signals and producing a resultant electrical signal related to the sum thereof.

5. Means for obtaining a measure of the horizontal range distance of an aircraft from a target including means establishing a sight line from the craft to the target, means measuring the vertical altitude of the craft above a horizontal target plane normal to an altitude vertical plane through the craft and producing an electrical signal proportional thereto, means measuring the angle between the said line of sight and said horizontal target plane and producing an electrical signal proportional thereto, an electrical multiplying network including trigonometric resolving means positionable in accordance with the magnitude of said measured angle to produce an electrical signal proportional to the cotangent of said measured angle and means supplying said altitude signal to said multiplying network for multiplication by the cotangent of said angle to produce an electrical signal proportional to the product thereof, and utilization means connected to said multiplying network to receive the said product signal.

6. Means for obtaining a measure of the horizontal range distance of an aircraft from a target including means establishing a sight line from the craft to the target, means measuring the vertical altitude of the craft above a horizontal target plane normal to an altitude vertical plane through the craft and producing an electrical signal proportional thereto, means measuring the angle between the sight line and the horizontal plane of the target, a cotangent potentiometer connected to receive said electrical altitude signal and having an adjustable slider arm positionable in accordance with said measured angle, and utilization means electrically connected to the slider arm of said potentiometer.

7. Means for obtaining a measure of the horizontal range distance of an aircraft from a target including means establishing a sight line from the craft to the target, means measuring the vertical altitude of the craft above a horizontal target plane normal to an altitude vertical plane through the craft and producing an electrical signal proportional thereto, means measuring the angle between the sight line and the horizontal plane of the target and producing an electrical signal proportional thereto, servo positioning means including a servo motor controlled in accordance with said last named signal and producing a shaft rotation proportional to said measured angle, a cotangent potentiometer connected to receive said electrical altitude signal and having an adjustable slider arm positionable by said servo motor in accordance with said measured angle, and electrical utilization means connected to the slider arm of said potentiometer.

8. Apparatus for obtaining a measure of the horizontal range distance of an aircraft from a target including, an optical sight head establishing a sight line from the craft to the target, means measuring the altitude of the craft above a horizontal target plane normal to an altitude vertical plane through the craft and producing an electrical signal proportional thereto, means measuring the angle between said sight line and said horizontal plane and producing an electrical signal proportional thereto, servo positioning means including a servo motor controlled in accordance with said measured angle signal, a cotangent potentiometer connected to receive said altitude signal for energization thereby and having an adjustable slider arm positionable by said servo motor, and utilization means connected to the slider arm of the said potentiometer means, said first named means including altitude sensing and transducing means measuring the absolute altitude of the craft above sea level and producing an electrical signal proportional thereto, manually adjustable means positionable in accordance with the known target altitude above sea level and producing an electrical signal proportional thereto, and electrical combining means connected to receive said absolute altitude signal and said target signal and producing a resultant signal related to the difference thereof corresponding to the absolute altitude of said target above the said horizontal target plane.

9. The combination in accordance with claim 8 above wherein said angle measuring means includes craft angle of attack measuring means producing an electrical signal proportional to angle of attack, a vertical reference source producing an electrical signal related to the pitch angle of the craft, and electrical combing means connected to receive the said attack angle and pitch angle signals and producing a resultant electrical signal related to the sum thereof for application to said servo positioning means.

10. Apparatus for obtaining a measure of the horizontal range distance of an elevated aircraft from a target measured from an initial position of the craft diving on the target, said apparatus comprising, in combination, an optical sight head providing a displaceable sight line for tracking the target, attack angle transducing means sensing the attack angle of the craft and producing an electrical signal related thereto, said sight head including servo positioning means connected to receive said signal from said attack angle sensing means for displacing the sight line in elevation and establishing a dive path thereby intersecting the target, means measuring the altitude of the craft above a horizontal target plane normal to an altitude vertical plane through the initial position of the craft and producing an electrical signal proportional thereto, a vertical reference source producing an electrical signal proportional to the pitch angle of a craft, electrical combining means connected to receive said attack angle signal and said pitch angle signal and producing a resultant electrical signal related to the sum thereof, a servo multiplying network including a servo motor controlled in accordance with said resultant signal and producing a shaft rotation proportional thereto, trigonometric resolving means positioned by said servo motor to produce a quantity proportional to a tangential trigonometric function of the angle of rotation of said servo motor, and means supplying said altitude signal to said multiplying network for multiplication by said tangential trigonometric function to produce an electrical signal proportional to the product thereof, and utilization means connected to said multiplying network to receive the said product signal.

11. Apparatus for obtaining a measure of the horizontal range distance of an elevated aircraft from a target measured from an initial position of the craft diving on the target, said apparatus comprising, in combination, an optical sight head providing a displaceable sight line for tracking the target, attack angle transducing means sensing the attack angle of the craft and producing an electrical signal related thereto, said sight head including servo positioning means connected to receive said signal from said attack angle sensing means for displacing the sight line in elevation and establishing a dive path thereby intersecting the target, means measuring the altitude of the craft above a horizontal target plane normal to an altitude vertical plane through the initial position of the craft and producing an electrical signal proportional thereto, a vertical reference source producing an electrical signal proportional to the pitch angle of a craft, electrical combining means connected to receive said attack angle signal and said pitch angle signal and producing a resultant electrical signal related to the sum thereof, a servo multiplying network including a servo motor controlled in accordance with said resultant signal and producing a shaft rotation proportional thereto, trigonometric resolving means positioned by said servo motor to produce an electrical signal proportional to the cotangent of the angle of shaft rotation of said servo positioning means, and means supplying said altitude signal to said multiplying network for multiplication by said cotangent function to produce an electrical signal proportional to the product thereof, and utilization means connected to said multiplying network to receive the said product signal.

12. Apparatus for obtaining a measure of the horizontal range distance of an elevated aircraft from a target measured from an initial position of the craft diving on the target, said apparatus comprising, in combination, an optical sight head providing a displaceable sight line for tracking the target, attack angle transducing means sensing the attack angle of the craft and producing an electrical signal related thereto, said sight head including servo positioning means connected to receive said signal from said attack angle sensing means for displacing the sight line in elevation and establishing a dive path thereby intersecting the target, means measuring the altitude of the craft above a horizontal target plane normal to an altitude vertical plane through the initial position of the craft and producing an electrical signal proportional thereto, a vertical reference source producing an electrical signal proportional to the pitch angle of a craft, electrical combining means connected to receive said attack angle signal and said pitch angle signal and producing a resultant electrical signal related to the sum thereof, a servo multiplying network including a servo motor controlled in accordance with said resultant signal and producing a shaft rotation proportional thereto, a cotangent potentiometer energized by said altitude signal and having an adjustable slider arm positionable in accordance with the shaft rotation of said servo motor, and utilization means connected to the slider arm of the said potentiometer.

13. Apparatus for obtaining a measure of the horizontal range distance of an elevated aircraft from a target measured from an initial position of the craft diving on the target, said apparatus comprising, in combination, an optical sight head providing a displaceable sight line for tracking the target, attack angle transducing means sensing the attack angle of the craft and producing an electrical signal related thereto, said sight head including servo positioning means connected to receive said signal from said attack angle sensing means for displacing the sight line in elevation and establishing a dive path thereby intersecting the target, means measuring the altitude of the craft above a horizontal target plane normal to an altitude vertical plane through the initial position of the craft and producing an electrical signal proportional thereto, a vertical reference source producing an electrical signal proportional to the pitch angle of a craft, electrical combining means connected to receive said attack angle signal and said pitch angle signal and producing a resultant electrical signal related to the sum thereof, a servo multiplying network including a servo motor controlled in accordance with said resultant signal and producing a shaft rotation proportional thereto, a cotangent potentiometer energized by said altitude signal and having an adjustable slider arm positionable in accordance with the shaft rotation of said servo motor, and utilization means connected to the slider arm of the said potentiometer, said means measuring the altitude of the craft above the horizontal target plane including transducing means measuring the absolute altitude of the craft above sea level and producing an electrical signal proportional thereto, manually adjustable means positionable in accordance with the known target altitude above sea level and producing an electrical signal proportional thereto, and means connected to receive said absolute altitude signal and said target signal and producing a signal related to the difference thereof corresponding to the said altitude of said target above the horizontal target plane.

14. Apparatus for obtaining a measure of the horizontal range distance of an elevated aircraft from a target measured from an initial position of the craft flying on a level approach mode toward the target, said apparatus comprising, in combination, an optical sight head providing a displaceable sight line for tracking the target and including means for displacing the sight line in elevation from a plane parallel to the target plane an angular amount to intersect the target, means measuring the altitude of a craft above a horizontal target plane normal to an altitude vertical plane through the initial position of the craft and producing an electrical signal proportional thereto, an electrical multiplying network including trigonometric resolving means positionable in accordance with the angular displacement of said sight line to produce a quantity proportional to a tangential trigonometric function thereof and means supplying said altitude signal to said multiplying network for multiplication by said tangential trigonometric function to produce an electrical signal proportional to the product thereof, and utilization means connected to said multiplying network to receive the said product signal.

No references cited.